Patented June 2, 1925.

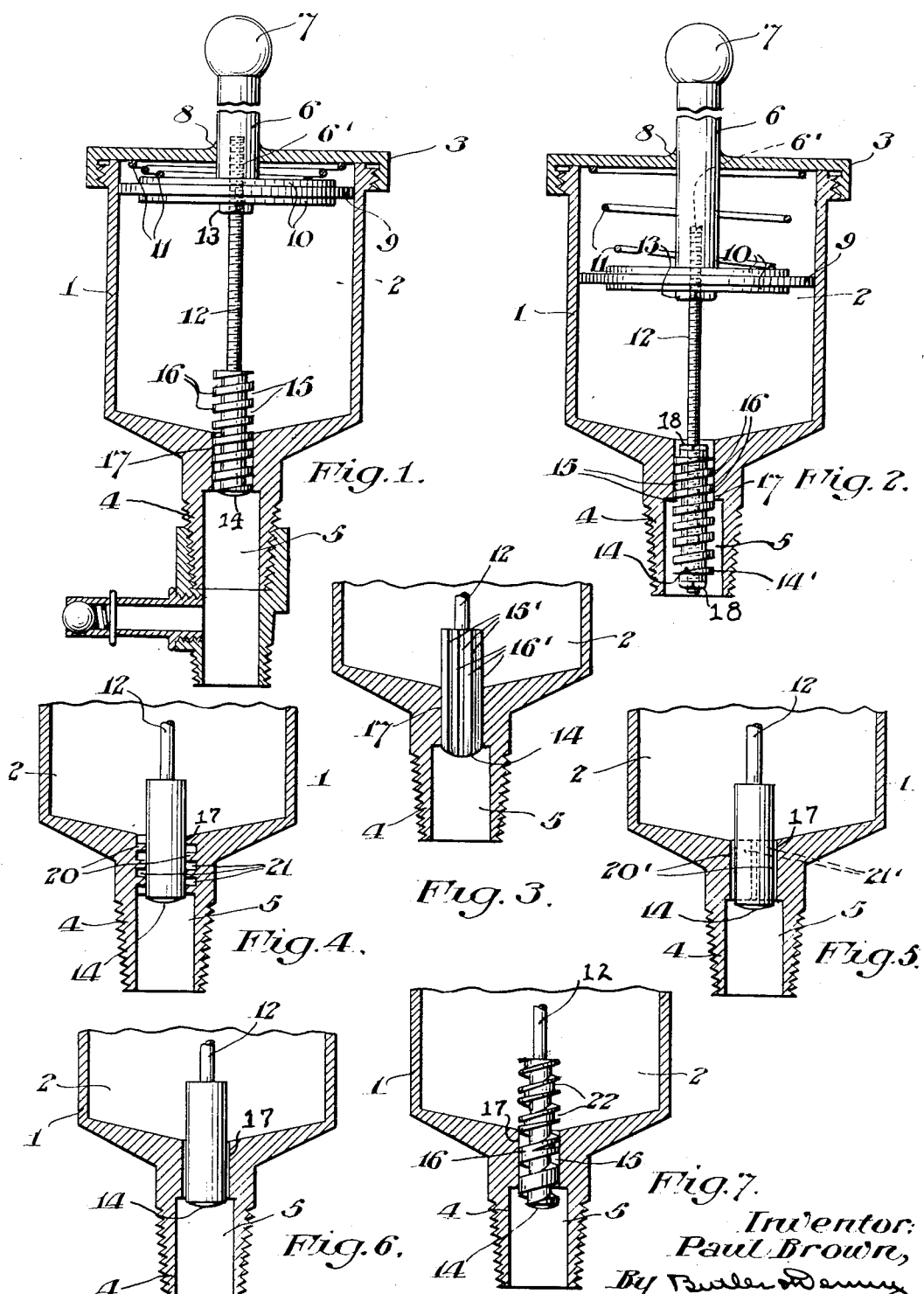

1,539,827

UNITED STATES PATENT OFFICE.

PAUL BROWN, OF PHILADELPHIA, PENNSYLVANIA, ASSIGNOR, BY MESNE ASSIGNMENTS, TO JOHN ROME BATTLE, OF ARDMORE, PENNSYLVANIA.

METHOD AND MECHANISM FOR CONTROLLING THE DISCHARGE OF LUBRICANT FROM LUBRICATORS.

Application filed September 5, 1922. Serial No. 586,086.

*To all whom it may concern:*

Be it known that I, PAUL BROWN, a citizen of the United States, residing in the city of Philadelphia, county of Philadelphia, and State of Pennsylvania, have invented an Improved Method and Mechanism for Controlling the Discharge of Lubricant from Lubricators, of which the following is a specification.

My invention is designed to effect the control of the feed of a lubricant from a lubricator by taking advantage of variation in the resistance to shear offered by a moving lubricant due to variations in the area of the retaining surfaces over which it passes and the consequent variations in the retardation affecting the velocity of such lubricant caused by variations in the effective retarding length of the discharge passage.

My primary object is to effect the discharge of the lubricant to a bearing at a uniform rate and I accomplish this by subjecting such lubricant to variable pressure and forcing it through a retarding channel, and diminishing the effective retarding length of such channel proportionately to the decrease of the pressure. This method is preferably practiced by subjecting lubricant in a reservoir to the action of a spring pressed plunger whose pressure remains substantially constant during a portion of the expansion of the spring and then decreases with comparative rapidity and acceleration as the spring further expands, and discharging such lubricant from the reservoir through a contracted discharge channel of an effective length having a predetermined retarding action during the maximum pressure of the plunger and is then shortened so as to decrease the shear resistance at a rate proportional to the decrease of the pressure of the expanding spring.

The retarding channel may be formed between the fixed wall of a passage, connecting the reservoir and a bearing, and the wall of a reciprocable baffler or controller head operable by the spring pressed plunger, and preferably consists of a helical groove of uniform cross-section in one or both of such walls and forming threads or ribs making a close slip contact preventing substantial flow between the walls of the passage and baffler, excepting through the retarding channel formed by the groove, which discharges into an enlarged counterbore through which the baffler moves as the reservoir discharges. The retarding channel may, however, be otherwise formed and supplemented as hereinafter described or as expediency may dictate.

In practice, the retarding channel is made of such effective length and cross-section as to provide the desired flow of the particular lubricant used under the maximum pressure of the plunger, and such length may be maintained while the plunger pressure continues uniform by making the controller or baffler of such length that its bottom will be substantially in the plane of the fixed wall at the beginning of the stroke and its top above the plane of the top of the fixed wall until the pressure of the plunger begins to substantially decrease at an accelerating rate, and the top of the controller is moved downward below the top of the fixed wall, thereby progressively shortening the effective length of the retarding channel and the shear resistance proportionately to the decrease in the spring pressure.

The characteristic features of my invention will more fully appear from the following description of several embodiments thereof, and the accompanying drawings in illustration of the same.

In the drawings, Fig. 1 is a longitudinal sectional view of a lubricator embodying my invention; Fig. 2 is a longitudinal sectional view of a slightly modified form of my invention with the parts in the partly discharged position; Fig. 3 is a longitudinal sectional view of the base of a lubricator with modified discharged controlling mechanism; Fig. 4 is a longitudinal sectional view of the base of a lubricator with a further modified discharge controlling mechanism; Fig. 5 is a longitudinal sectional view of the base of a lubricator with a further modified discharge controlling mechanism; Fig. 6 is a longitudinal sectional view of the base of a lubricator with a further modified discharge controlling mechanism; and Fig. 7 is a longitudinal sectional view of the base of a lubricator with a further modified discharge controlling mechanism.

In the drawings, a cup or body 1, containing a chamber or reservoir 2, is provided with a threaded top closure 3 and with an externally threaded boss 4 containing a discharge passage 5. A stem 6, provided with a knob 7, is reciprocable through an aperture 8 in the closure 3 and has fixed thereto within the reservoir 2 a piston head or plunger comprising the washer 9 and plates 10 normally pressed downward by a coiled spring 11 disposed between the piston head and closure.

The stem 6 contains a threaded bore 6' in which is screwed a threaded rod or shank 12 passing through the washer 9 and plates 10, the rod and piston head being fixed in place by a lock nut 13.

As illustrated in Fig. 1, the rod 12 has at the bottom thereof an enlarged barrel or controller head 14 containing the helical groove 15 of rectangular cross-section forming a retarding channel whose convolutions are separated by a thread or rib 16, which is reciprocable in a contracted passage 17 of uniform cross-section formed in the base of the cup and communicating with the larger counter-bore 5, the periphery of the thread 16 making a close slip fit with the walls of the passage 17.

The cup may be filled from the top by removing the threaded closure 3 and plunger 9, or it may be and preferably is filled by means of a pressure gun through the check valve controlled fitting into which the boss 4 is screwed, the fitting having a similar boss for engagement in the socket of a bearing.

When the reservoir is filled with lubricant and ready to be discharged, the lower end of the wall of the controller head 14 is substantially in the plane of the bottom of the wall of the passage 17 and the top of the wall of the controller head is disposed well above the top of the wall of the passage 17 so that the lubricant discharged must travel through the retarding channel 15 in its convolutions from the top to the bottom of the wall of the passage 17 until the top of the controller 14 has moved downward into the plane of the top of the wall of the passage 17. At this point the pressure of the spring 11, which is substantially constant during the first portion of its stroke, begins to decrease at an accelerating rate, and as the top of the controller 14 passes below the top of the wall of the passage 17, it permits the lubricant to flow freely in the upper portion of such passage and consequently shortens the effective length of the retarding channel 15 and decreases the shear resistance to the flow of the lubricant proportionally to the number of the convolutions of the channel thus cut off and the diminution of the pressure of the spring.

When the controller 14 has passed entirely through the passage 17, the flow of lubricant is retarded only by the resistance offered by a film moving between the controller 14 and counter-bore 5, and as the spring further expands the bottom of the controller 14 may move out of the counter-bore to decrease even this resistance if the socket into which the lubricant discharges is made larger than the cross-sectional area of the counter-bore.

By adjusting the rod 12 in the bore 6', it is possible to change the period at which the shortening of the effective retarding channel begins relatively to the expansion of the spring.

Fig. 2 shows the lubricator partially discharged and also shows the controller 14 formed of a sleeve 14' on the rod 12 and containing the groove 15 forming a retarding channel whose convolutions are separated by the rib or thread 16 making a close slip fit with the wall of the passage 17. The sleeve is fixed on the bottom of the rod by the adjustable locking nuts 18 permitting further adjustment of the relative actions of the spring and controller. The operation of the construction shown in this figure is substantially the same as that shown in Fig. 1.

As shown in Fig. 3, the channels 15' instead of being helical, may be substantially vertical or at any suitable angle, and are separated by longitudinal threads or ribs 16' making a close slip fit with the wall of the passage 17.

As shown in Fig. 4, the controller 14 may have a plain cylindrical wall making a close slip fit with the threads or ribs 20 between the helical groove 21 in the wall of the passage 17, the groove providing a retarding channel of uniform cross-section, the length of which is varied by the movement of the controller 14 through the passage 17.

As shown in Fig. 5, the grooves 20' formed in the wall of the passage 17, instead of being helical, may be substantially perpendicular or at any suitable angle and are separated by longitudinal threads or ribs 21' with which the cylindrical wall of the controller 14 makes a close slip fit; or as shown in Fig. 6 the threads may be eliminated and the retarding channel of uniform cross-section formed between the plain cylindrical wall of the controller 14 and the plain cylindrical wall of the passage 17.

As shown in Fig. 7, a controller similar to that shown in Fig. 1 may be provided with wide ribs or threads 16 and the secondary groove or channel 22 formed in such threads beginning intermediate the length of the controller and of gradually increasing width and depth, to provide for the discharge of a very stiff lubricant or for the use of the spring whose expansible force decreases with more than usual rapidity.

Having described my invention, I claim:—
1. The method of controlling the feed of lubricant from a lubricator which consists in subjecting such lubricant to variable pressure and forcing it through a channel, and diminishing the effective length of said channel proportionately to the decrease of said pressure.

2. A lubricator comprising a reservoir having a discharge channel, means for applying variable pressure to lubricant in said reservoir, and means for decreasing the effective length of said channel as the lubricant in said reservoir is discharged.

3. A lubricator comprising a reservoir having a retarding discharge channel, a spring pressed member for applying variable pressure to lubricant in said reservoir, and means for decreasing the effective length of said channel proportionately to the decrease of the pressure on said lubricant.

4. A lubricator comprising a reservoir having a retarding discharge channel, a spring pressed member for applying variable pressure to lubricant in said reservoir, and means operated by the movement of said member for decreasing the effective length of said channel as the pressure on said lubricant decreases.

5. A lubricator comprising a reservoir and having a member containing a passage, a controller member reciprocable in said passage, walls of said members making a close slip fit and the wall of one of said members containing a groove forming a retarding channel for the discharge of lubricant from said reservoir, and a spring pressed member for applying variable pressure to said lubricant.

6. A lubricator comprising a reservoir and having a member containing a passage, a controller member reciprocable in said passage, walls of said members making a close slip fit and the wall of one of said members containing a helical groove forming a retarding channel for the discharge of lubricant from said reservoir, and means comprising a spring pressed member for applying variable pressure to said lubricant and moving said controller member to vary the effective length of said discharge channel as the pressure on said lubricant decreases.

7. A lubricator comprising a reservoir having a member containing a discharge passage, a spring pressed plunger for applying pressure to a lubricant in said reservoir, said plunger having connected therewith a stem provided with a controller member reciprocable in said discharge passage and forming with said member first named a retarding channel for the discharge of lubricant, said controller member having a wall of greater length than the length of the wall of said discharge passage and being movable downwardly through said passage to decrease the effective length of the retarding channel as the pressure on said lubricant decreases.

In testimony whereof I have hereunto set my name this 1st day of Sept., 1922.

PAUL BROWN.